US010856325B2

(12) United States Patent
Kim et al.

(10) Patent No.: US 10,856,325 B2
(45) Date of Patent: *Dec. 1, 2020

(54) SYSTEM ACCESS METHOD AND APPARATUS OF A NARROWBAND TERMINAL IN A WIRELESS COMMUNICATION SYSTEM SUPPORTING WIDEBAND AND NARROWBAND TERMINALS

(71) Applicant: Samsung Electronics Co., Ltd., Gyeonggi-do (KR)

(72) Inventors: Youngbum Kim, Seoul (KR); Juho Lee, Gyeonggi-do (KR); Joonyoung Cho, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/429,647

(22) Filed: Jun. 3, 2019

(65) Prior Publication Data
US 2019/0289630 A1   Sep. 19, 2019

Related U.S. Application Data

(63) Continuation of application No. 15/463,976, filed on Mar. 20, 2017, now Pat. No. 10,314,074, which is a (Continued)

(30) Foreign Application Priority Data

Sep. 23, 2011   (KR) .................. 10-2011-0096206

(51) Int. Cl.
*H04W 74/00*   (2009.01)
*H04W 74/08*   (2009.01)

(52) U.S. Cl.
CPC ....... *H04W 74/002* (2013.01); *H04W 74/006* (2013.01); *H04W 74/0833* (2013.01)

(58) Field of Classification Search
CPC ............. H04W 74/002; H04W 74/006; H04W 74/0833
See application file for complete search history.

(56) References Cited

U.S. PATENT DOCUMENTS

| 5,463,623 A | 10/1995 | Grimes |
| 8,483,107 B2 | 7/2013 | Ahn et al. |

(Continued)

FOREIGN PATENT DOCUMENTS

| KR | 100937299 | 1/2010 |
| KR | 10201000073967 | 7/2010 |

(Continued)

OTHER PUBLICATIONS

NTT DOCOMO, "Way Forward on Additional Smaller Carrier", R4-100715, TSG-RAN Working Group 4 Meeting #54, Feb. 22-26, 2010, pp. 1-2.

(Continued)

*Primary Examiner* — Gary Mui
(74) *Attorney, Agent, or Firm* — The Farrell Law Firm, P.C.

(57) ABSTRACT

Apparatuses (including base stations and terminals), systems, and methods for supporting both wideband and narrowband communications are described. In one aspect, a base station supporting first type terminals operating on a first bandwidth and second type terminals operating on a second bandwidth is described, having an information formatter, a transceiver, and a controller. The information formatter generates a Low-end Master Information Block (L-MIB) and a Low-end System Information Block (L-SIB), which are transmitted by the transceiver to first type and (Continued)

second type terminals. The L-MIB includes control information on an L-subframe configuration for supporting a second type terminal and a sub-band configuration of the L-subframe, while the L-SIB includes information on downlink reception and uplink transmission of the second type terminal. When the base station receives a Random Access Channel (RACH) preamble request from one of the terminals, the base station performs the random access procedure.

20 Claims, 13 Drawing Sheets

Related U.S. Application Data continuation of application No. 14/708,938, filed on May 11, 2015, now Pat. No. 9,603,166, which is a continuation of application No. 13/625,468, filed on Sep. 24, 2012, now Pat. No. 9,031,019.

(56) References Cited

U.S. PATENT DOCUMENTS

| | | | |
|---|---|---|---|
| 8,538,411 | B2 | 9/2013 | Kwon et al. |
| 9,031,019 | B2 | 5/2015 | Kim |
| 2008/0069033 | A1 | 3/2008 | Li et al. |
| 2008/0200146 | A1 | 8/2008 | Wang |
| 2009/0215499 | A1 | 8/2009 | Moon et al. |
| 2009/0253401 | A1 | 10/2009 | Lee |
| 2009/0280823 | A1 | 11/2009 | Petrovic |
| 2010/0111043 | A1 | 5/2010 | Balasubramanian et al. |
| 2010/0208629 | A1 | 8/2010 | Ahn et al. |
| 2010/0227611 | A1* | 9/2010 | Schmidt ............... H04W 76/15 455/434 |
| 2010/0272015 | A1 | 10/2010 | Chmiel |
| 2011/0105119 | A1 | 5/2011 | Bienas |
| 2011/0194478 | A1 | 8/2011 | Lee et al. |
| 2011/0211489 | A1 | 9/2011 | Chung et al. |
| 2012/0106465 | A1 | 5/2012 | Haghighat |
| 2013/0077582 | A1 | 3/2013 | Kim et al. |
| 2013/0083753 | A1 | 4/2013 | Lee |
| 2013/0109391 | A1 | 5/2013 | Lee et al. |
| 2013/0136098 | A1 | 5/2013 | Li |
| 2013/0223299 | A1* | 8/2013 | Yang .................... H04L 1/1812 370/280 |
| 2013/0308503 | A1 | 11/2013 | Kim |
| 2013/0322355 | A1 | 12/2013 | Seo |
| 2014/0022981 | A1 | 1/2014 | Kim |
| 2014/0078941 | A1 | 3/2014 | Seo |
| 2015/0016419 | A1 | 1/2015 | Kim |
| 2015/0245378 | A1 | 8/2015 | Kim |

FOREIGN PATENT DOCUMENTS

| | | |
|---|---|---|
| KR | 1020110049900 | 5/2011 |
| KR | 1020110069735 | 6/2011 |
| KR | 1020110074747 | 7/2011 |
| WO | WO 2007/091831 | 8/2007 |
| WO | WO 2009/116751 | 9/2009 |
| WO | WO 2010/050704 | 5/2010 |
| WO | WO 2011/053055 | 5/2011 |
| WO | WO 2011/099744 | 8/2011 |

OTHER PUBLICATIONS

European Search Report dated May 11, 2015 issued in counterpart application No. 12834323.3-1854.
Fujitsu, "On Support of Low-Cost MTC Terminals with Reduced Tx/Rx Bandwidths", R1-112669, 3GPP TSG-RAN WG1 Meeting #66, Aug. 22-26, 2011, 2 pages.
Research in Motion UK Limited, "PSS/SSS Detection in Heterogeneous Networks", R1-112369, 3GPP TSG RAN WG1 Meeting #66, Aug. 22-26, 2011, 6 pages.
Korean Office Action dated Mar. 22, 2018 issued in counterpart application No. 10-2011-0096206, 8 pages.
CATT, RITT, "Indication of PHICH Resource for TDD" R1-081326, 3GPP TSG RAN WG1 meeting #52bis, Mar. 31-Apr. 4, 2008, 6 pages.
Nokia, Nokia Siemens Networks, Associated PDCCH Signaling for PCH, RACH Response and BCCH Transmission on PDSCH, R1-080298, 3GPP TSG RAN WG1 Meeting #51bis, Jan. 14-18, 2008, 3 pages.
Korean Office Action dated Sep. 19, 2018 issued in counterpart application No. 10-2011-0096206, 8 pages.
European Search Report dated Dec. 14, 2018 issued in counterpart application No. 18207368.4-1214, 12 pages.
3rd Generation Partnership Project; Technical Specification Group Radio Access Network; Evolved Universal Terrestrial Radio Access (E-UTRA) and Evolved Universal Terrestrial Radio Access Network (E-UTRAN) Overall Description; Stage 2 (Release 8), 3GPP TS 36.300 V8.12.0, Mar. 2010, 149 Pages.

* cited by examiner

SYSTEM ACCESS METHOD AND APPARATUS OF A NARROWBAND TERMINAL IN A WIRELESS COMMUNICATION SYSTEM SUPPORTING WIDEBAND AND NARROWBAND TERMINALS

PRIORITY

This application is a Continuation Application of, and claims priority under 35 U.S.C. § 120 to, U.S. patent application Ser. No. 15/463,976, filed on Mar. 20, 2017 and issuing on Jun. 4, 2019, which is a Continuation Application of, and claims priority under 35 U.S.C. § 120 to, U.S. patent application Ser. No. 14/708,938, filed on May 11, 2015 and issued on Mar. 21, 2017 as U.S. Pat. No. 9,603,166, which is a Continuation Application of, and claims priority under 35 U.S.C. § 120 to, U.S. patent application Ser. No. 13/625,468 filed on Sep. 24, 2012 and issued on May 12, 2015 as U.S. Pat. No. 9,031,019, which claims priority under 35 U.S.C. § 119(a) to Korean Pat. App. Ser. No. 10-2011-0096206, which was filed in the Korean Intellectual Property Office on Sep. 23, 2011, the entire disclosures of all of which are incorporated herein by reference.

BACKGROUND OF THE INVENTION

1. Field of the Invention

The present invention relates generally to a cellular radio communication system and, in particular, to a system access method of a narrowband terminal in a cellular radio communication system supporting both wideband and narrowband terminals.

2. Description of the Related Art

Long Term Evolution (LTE) utilizes Orthogonal Frequency Division Multiplexing (OFDM) in a downlink and Single Carrier Frequency Division Multiple Access (SC-FDMA) in an uplink. Such a multiple access technique is characterized in that time-frequency resources carrying data or control information are arranged orthogonally to discriminate among per-user data and/or control information.

FIG. 1 illustrates a basic structure of time-frequency grid of radio resource for transmitting data and control channels in a downlink of a conventional LTE system.

In FIG. 1, the horizontal axis denotes time, and the vertical axis denotes frequency. An OFDM symbol is the smallest transmission unit on the time axis, a slot 106 includes $N_{sym}$ OFDM symbols 102, and a subframe 105 includes two slots. A slot is 0.5 ms, and a subframe is 1.0 ms. A subcarrier is the smallest transmission unit in the frequency domain, and the entire system transmission band includes $N_{BW}$ subcarriers 104.

In the time-frequency grid, a Resource Element (RE) 112 is the basic unit indicated by an OFDM symbol index and a subcarrier index. The Resource Block (RB) or Physical Resource Block (PRB) 108 includes the $N_{symb}$ consecutive OFDM symbols in the time domain 102 and the $N_{RB}$ consecutive subcarriers in the frequency domain 110. Accordingly, an RB 108 includes $N_{symb} \times N_{RB}$ REs. An RB is the smallest unit that can be scheduled for transmission. In an LTE system, $N_{symb}=7$ and $N_{RB}=12$, and $N_{BW}$ and $N_{RB}$ is in proportion to the system bandwidth.

The control information is transmitted in N OFDM symbols at the beginning of the subframe. Typically, N={1, 2, 3}. Accordingly, the amount of control information carried in a current subframe depends on the value of N. The control information includes an indicator that indicates the number of OFDM symbols carrying the control information, uplink and downlink scheduling information, Hybrid Automatic Repeat reQuest (HARQ) Acknowledgement (ACK)/Negative ACK (NACK) signal, Multiple Input Multiple Output (MIMO)-related control information, etc.

The LTE system utilizes HARQ for retransmitting data that fails decoding in the physical layer. HARQ is a technique for ensuring reliability of data transmission in such a way that a receiver transmits a NACK to a transmitter to request a retransmission of the data that has failed decoding in the physical layer. The receiver combines the retransmitted data with the previously transmitted data to increase the data reception performance. If data is decoded successfully, the receiver transmits an ACK to the transmitter such that the transmitter can transmit next data.

In a cellular radio communication system, scalable bandwidth is a significant feature for providing various types of data services. LTE supports scalable bandwidths of 1.4, 3, 5, 10, 15, and 20 MHz. These bandwidths correspond to 6, 15, 25, 50, 75, and 100 RBs, respectively. The mobile carriers use one of the available bandwidths to provided services. However, it is then necessary for the LTE system having a specific system bandwidth to support the terminals with different bandwidth capabilities.

For example, an LTE system having a 10 MHz system bandwidth cannot simultaneously support a 10 MHz terminal and a 1.4 MHz terminal. Basically, the terminal supporting the bandwidth that is narrower than the system bandwidth cannot receive a downlink control channel that is transmitted across the entire system bandwidth in the LTE system.

Also, terminals supporting different bandwidths may interfere with each other.

SUMMARY OF THE INVENTION

The present invention has been made in an effort to solve the above problems and to provide at least the advantages described below.

Accordingly, an aspect of the present invention is to provide a system access method that is capable of supporting both wideband and narrowband terminals in a wireless communication system.

In accordance with an aspect of the present invention, a base station in a wireless communication system supporting first type terminals operating on a first bandwidth and second type terminals operating on a second bandwidth is provided, the base station including an information formatter; a transceiver; and a controller configured to control the information formatter to generate a Low-end Master Information Block (L-MIB) and a Low-end System Information Block (L-SIB), control the transceiver to transmit the generated L-MIB and L-SIB, and perform a random access procedure, when a Random Access Channel (RACH) preamble request is received from one of the first type terminals and the second type terminals, wherein the L-MIB includes control information on an L-subframe configuration for supporting a second type terminal and a sub-band configuration of the L-subframe, and wherein the L-SIB includes information on downlink reception and uplink transmission of the second type terminal.

In accordance with another aspect of the present invention, a terminal in a wireless communication system supporting first type terminals operating on a first bandwidth and second type terminals operating on a second bandwidth is provided, the terminal including a transceiver; and a controller configured to control the transceiver to receive a Synchronization CHannel (SCH), a Low-end Master Information Block (L-MIB), and a Low-end System Information Block (L-SIB) and to transmit a Random Access Channel (RACH) preamble to the base station based on the received L-MIB and the received L-SIB, wherein the received L-MIB includes control information on an L-subframe configuration for supporting a second type terminal and a sub-band configuration of the L-subframe, and the L-SIB includes information on downlink reception and uplink transmission of the second type terminal.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
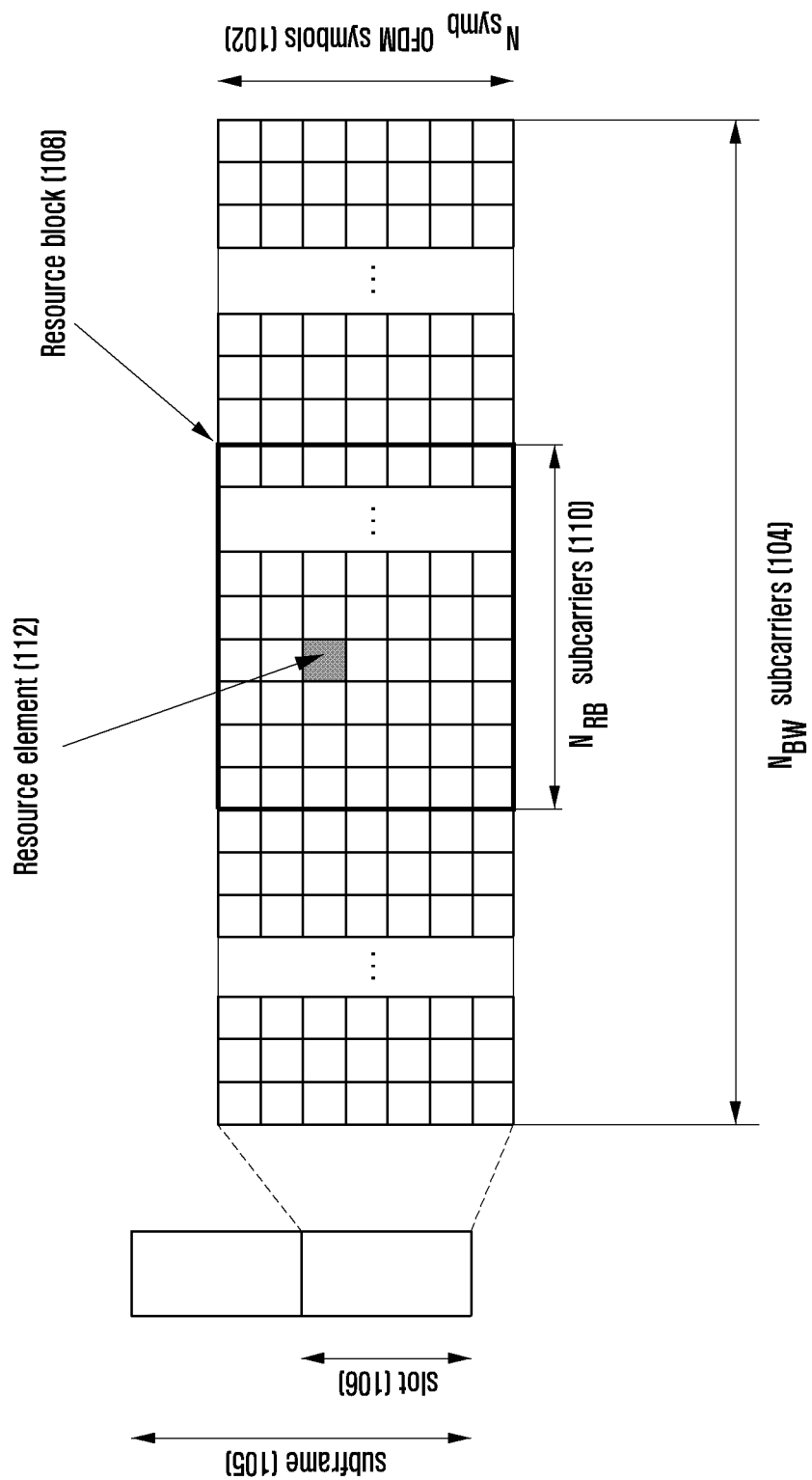
FIG. 1 illustrates a basic structure of a time-frequency grid of a radio resource for transmitting data and control channels in a downlink of a conventional LTE system.

Various embodiments of the present invention are described in detail below with reference to the accompanying drawings. However, detailed descriptions of well-known functions and structures incorporated herein may be omitted to avoid obscuring the subject matter of the present invention.

Terms used herein are defined by taking functions of the present invention into account and can be changed according to the practice or intention of users or operators. Therefore, definition of the terms should be made according to overall disclosures set forth herein.

In the following description, a base station, i.e., a host, can be, for example, at least one of a Node B, an eNB, a radio access unit, a base station controller, or a specific node on the network. The terminal can be, for example, a UE, a Mobile Station (MS), a cellular phone, a smartphone, a computer, or a multimedia system equipped with communication function.

Herein, the term "DownLink (DL)" denotes a transmission path of a radio signal from a base station to a terminal, and the term "UpLink (UL)" denotes a transmission of a radio signal from a terminal to a base station.

Although embodiments of the present invention will be described below with reference to LTE and LTE-Advanced (LTE-A) systems, it will be understood by those skilled in the art that the present invention is also applicable to other communication systems having similar technical backgrounds and channel formats, with slight modifications, without departing from the spirit and scope of the present invention.

For simplicity, a legacy wideband LTE terminal supporting a system bandwidth a mobile communication system is referred to herein as a "Normal UE (N-UE)". Also, the term "first type terminal supporting first type bandwidth" is interchangeably used with N-UE, under an assumption that the first type bandwidth is wider than a second type bandwidth, as will be described later.

An LTE terminal supporting a narrower bandwidth than a system bandwidth is referred to as a "Low-end UE (L-UE)". Also, the term "second type terminal supporting the second type bandwidth" is interchangeably used with L-UE, under the assumption that the second type bandwidth is narrower than the first type bandwidth.

For example, the L-UE can be a low cost or low-end terminal supporting low data rate service such as voice communication and Machine Type Communication (MTC) or Machine-to-Machine (M2M) service, as compared to N-UE.

In accordance with an embodiment of the present invention, a physical channel and control information of a legacy LTE system are reused as much as possible to support the L-UE while minimizing system design complexity. However, there are still problems to be addressed for simultaneously supporting both the N-UE and L-UE in the LTE system. For example, when the N-UE supporting wideband and the L-UE supporting narrowband coexist in the LTE system, the L-UE cannot receive a PDCCH designed for the legacy N-UE to receive across the entire system band. If an L-PDCCH is defined in a time-frequency resource for carrying the legacy PDCCH, the legacy N-UE has to know the location of the resource mapped to the L-PDCCH to receive the PDCCH addressed to the N-UE. In order to accomplish this, in accordance with an embodiment of the present invention, a method for time-division multiplexing the control channels addressed to the N-UE and L-UE is provided.

Figure 2:
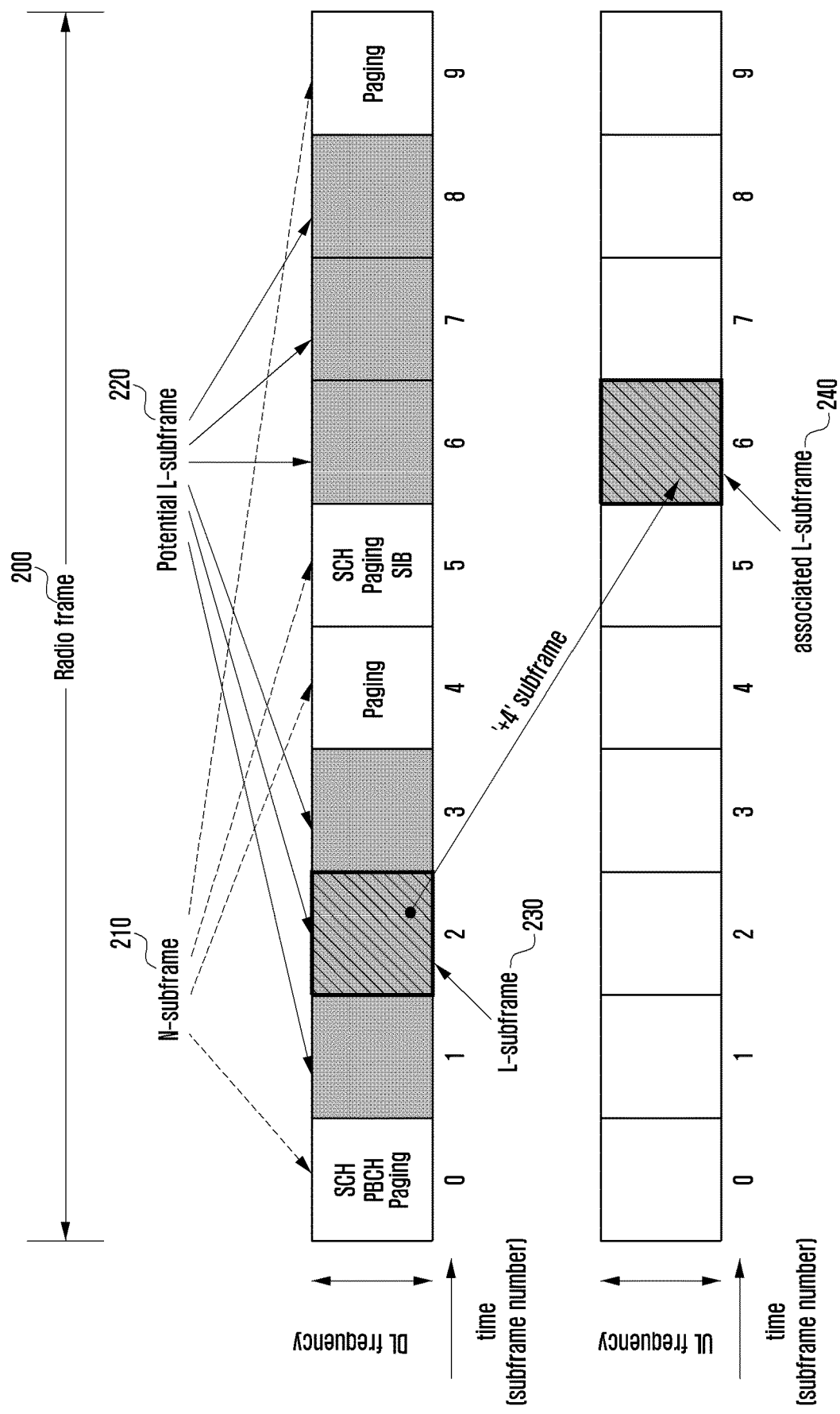
FIG. 2 illustrates a method of multiplexing a Normal-User Equipment (N-UE) and a Low-end UE (L-UE) in an LTE Frequency Division Duplexing (FDD) system according to an embodiment of the present invention.
Figure 3:
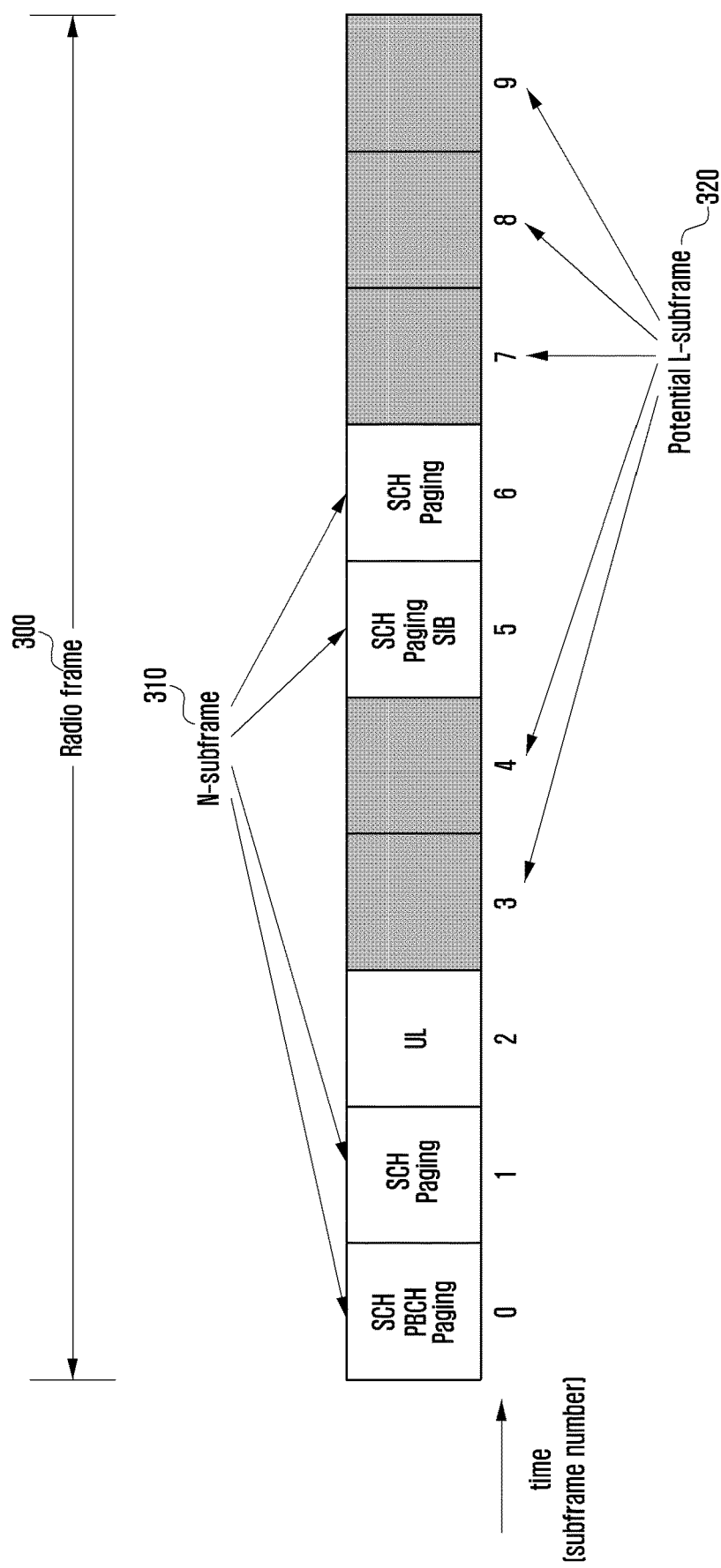
FIG. 3 illustrates a method of multiplexing an N-UE and an L-UE in an LTE Time Division Duplexing (TDD) system according to an embodiment of the present invention.

FIG. 2 illustrates a method of multiplexing an N-UE and an L-UE in an LTE FDD system according to an embodiment of the present invention, and FIG. 3 illustrates a method of multiplexing an N-UE and an L-UE in an LTE TDD system according to an embodiment of the present invention.

For an LTE downlink, a location of a subframe carrying an essential physical channel and Synchronization CHannel (SCH) as control information, a Physical Broadcast CHannel (PBCH), a paging message, and a System Information Block (SIB) is fixed.

According to the LTE FDD specification, the SCH is carried in subframe #0 and subframe #5, the PBCH is carried in subframe #0, the paging message is carried in subframe #0, subframe #4, subframe #5, and subframe #9, and the SIB is carried in subframe #5. These subframes are referred to as Normal-subframes (N-subframes).

The SCH includes a Primary Synchronization Sequence (PSS) and a Secondary Synchronization Sequence (SSS) as downlink physical channels for the UE to acquire radio frame timing synchronization and a cell IDentifier (ID). The SCH is mapped to 62 REs in the center frequency of the LTE system bandwidth.

The PBCH provides a Master Information Block (MIB) carrying core information for a UE to access a system, such as DL system bandwidth, Physical HARQ Indicator CHannel (PHICH) resource information, and a System Frame Number (SFN). The PBCH is mapped to 72 REs in the center frequency of the LTE system bandwidth in the frequency domain.

The paging message is transmitted by an eNB in the downlink to notify the UE in an idle mode of an incoming call or a change of an SIB of the corresponding cell. The SIB is the control information required for the UE to access the system in addition to the MIB and includes cell-specific radio resource configuration information. The SIB is transmitted to the UE through Physical Downlink Shared Channel (PDSCH) as downlink physical data channel.

As illustrated in FIG. 2, subframe #0, subframe #4, subframe #5, and subframe #9 are N-subframes among the 10 total subframes of a radio frame 200, according to the FDD LTE standard. The L-UE according to an embodiment of the present invention receives the SCH and PBCH at least among the physical channels and control information in order to acquire radio frame timing synchronization, a cell ID, and an MIB.

The eNB transmits a downlink control channel or a data channel for supporting the L-UE in subframes other than N-subframes in a radio frame. These subframes are referred to as potential L-subframes, and the L-subframe, which actually carries the control channel or data channel for supporting the L-UE is referred to as an L-subframe 230. The term "L-subframe" indicates the subframe designated for the second type terminal supporting a bandwidth narrower than the system bandwidth, but is not restricted to meaning a subframe for dedicated use by the second type terminal. That is, the L-subframe can be used for control or data channel transmission for the first type terminal too.

According to the FDD LTE standard, subframe #1, subframe #2, subframe #3, subframe #6, subframe #7, and subframe #8 are the potential L-subframes.

In FIG. 2, subframe #2 is configured as L-subframe. Further, although FIG. 2 is directed to a case where only one subframe is configured as an L-subframe, it is possible for one or more subframes to be configured as an L-subframe.

If the eNB transmits downlink data to the L-UE in subframe #2, the L-UE feeds back a HARQ ACK/NACK corresponding to the received downlink data. The L-UE transmits the HARQ ACK/NACK to the eNB, after a predetermined time, in consideration of the reception signal processing time for the downlink data.

In FIG. 2, the L-UE transmits the HARQ ACK/NACK to the eNB in subframe #6, assuming that the signal processing time is 4 subframes.

In accordance with an embodiment of the present invention, the subframe associated with the L-subframe 230 in HARQ timing relationship is referred to as an "associated L-subframe 240". The eNB uses 1 to 3 OFDM symbols at the beginning of the L-subframe 230 for transmitting control signal addressed to the N-UE and the rest for transmitting control or data channel for supporting the L-UE.

Referring to FIG. 3, in the LTE TDD standard, the subframes of a radio frame are sorted into uplink and downlink subframes according to a TDD UL/DL configuration. Subframe #0, subframe #1, subframe #5, and subframe #6 are fixed as downlink subframes, regardless of the TDD UL/DL configuration, and subframe #2 is fixed as an uplink subframe. Among the downlink signals, an SCH is transmitted in subframe #0, subframe #1, subframe #5, and subframe #6; a PBCH is transmitted in subframe #0, a paging message is transmitted in subframe #0, subframe #1, subframe #5, and subframe #6; and an SIB is transmitted in subframe #5.

Accordingly, for LTE TDD, subframe #0, subframe #1, subframe #5, and subframe #6 of one radio frame 300 are N-subframes 310; and subframe #3, subframe #4, subframe #7, subframe #8, and subframe #9 are potential L-subframes 320. Subframe #3, subframe #4, subframe #7, subframe #8, and subframe #9 can be used as uplink or downlink subframes according to the TDD UL/DL configuration.

Figure 4:
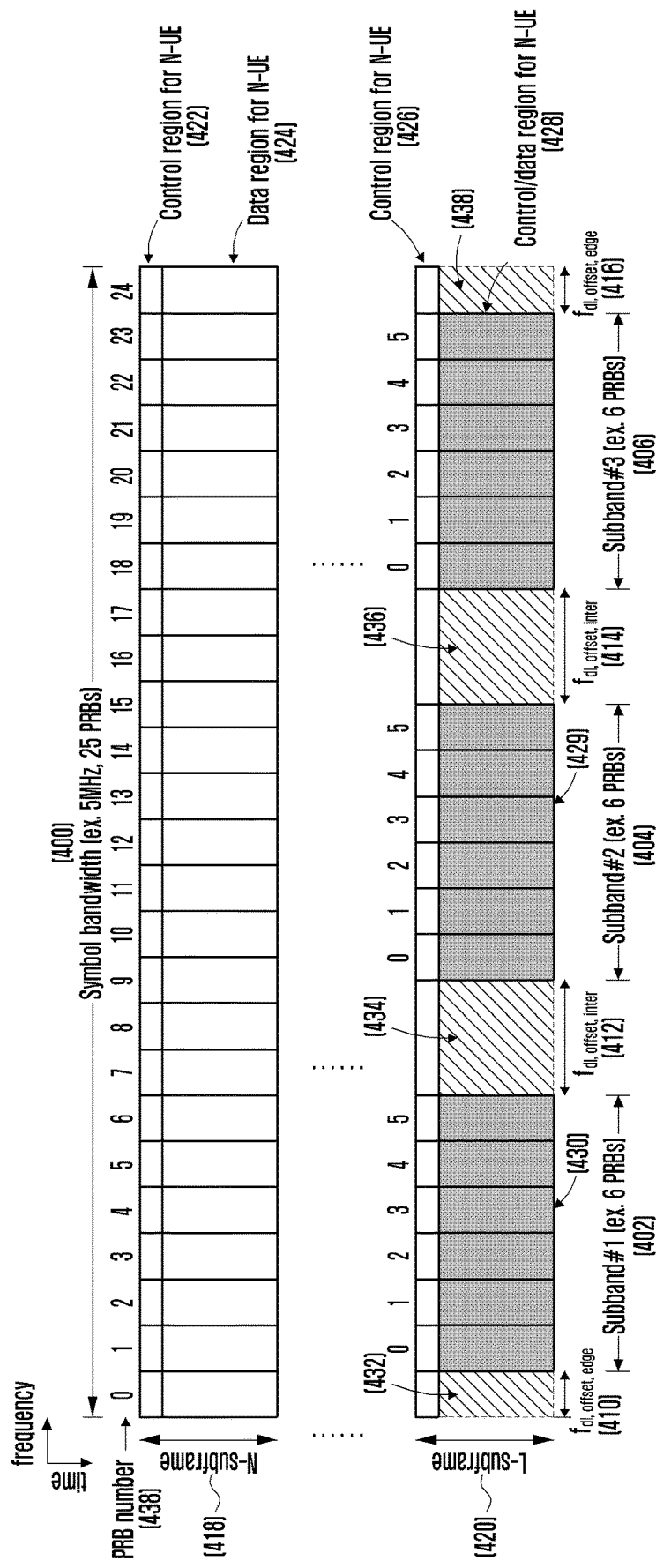
FIG. 4 illustrates a time-frequency resource in respective N-subframe and L-subframe for multiplexing an N-UE and an L-UE in an LTE system according to an embodiment of the present invention.

FIG. 4 illustrates a time-frequency resource in respective N-subframe and L-subframe for multiplexing an N-UE and an L-UE in an LTE system according to an embodiment of the present invention.

Referring to FIG. 4, the system bandwidth is 5 MHz and includes 25 PRBs, i.e., PRB #0 to PRB #24. The N-UE is a broadband UE supporting a bandwidth of 5 MHz, which is equal to the system bandwidth, and the L-UE is the narrowband UE supporting a bandwidth of 1.4 MHz, which is narrower than the system bandwidth. The eNB divides the system bandwidth to secure one or more sub-bands for the L-UEs in the L-subframe.

In FIG. 4, three sub-bands, i.e., sub-band #1 402, sub-band #2 404, and sub-band #3 406, are used. Each sub-band has a bandwidth of 1.4 MHz and includes 6 PRBs such that the L-UE can support the sub-band. The L-UE operates in one of the sub-bands 402, 404, and 406. The sub-bands are spaced apart to minimize the interference to each other. Sub-band #1 402 is spaced apart from an edge of the system band as much as $f_{dl,offset,edge}$ 410 and from the sub-band #2 404 as much as $f_{dl,offset,Inter}$ 412. Sub-band #3 406 is spaced apart from the other edge of the system band as much as $f_{dl,offset,edge}$ 416 and from the sub-band #2 404 as much as $f_{dl,offset,Inter}$ 414. The offsets, i.e., $f_{dl,offset,edge}$ 410, $f_{dl,offset,Inter}$ 412, $f_{dl,offset,Inter}$ 414, and $f_{dl,offset,edge}$ 416, and the bandwidth of each sub-band are signaled from the eNB to the UE or set to hardcoded values agreed between the eNB and the UE.

During the N-subframe 418, the L-UE stops receiving data or control signal from the eNB while the N-UE receives data or control signal transmitted by the eNB. The eNB transmits the control signal addressed to the N-UE in N OFDM symbols 422 at the beginning of the N-subframe and transmits the data signal addressed to the N-UE in the rest symbols duration 424. The control signal includes the control information indicating the value of N, the control information for scheduling downlink or uplink data signal, and a HARQ ACK/NACK, and is distributively transmitted across the entire system band.

The eNB transmits the control information for supporting the legacy N-UE in the N OFDM symbols duration 426 at the beginning of the L-subframe 420. The control information includes the control information indicating the value of N, the control information for scheduling an uplink data signal, and a HARQ ACK/NACK, and is distributively transmitted across the entire system band. The L-UE does not receive the control information or the data signal from the eNB during the N OFDM symbols duration 426 at the beginning of the L-subframe 420.

The eNB transmits the control information or data for supporting the L-UE during the rest time duration of the sub-bands 428, 429, and 430, i.e., the time duration following the first N OFDM symbols region of the L-subframe. In this case, a certain L-UE operates in one of the sub-bands. For example, if the L-UE #1 operates on the sub-band #1 402, the eNB transmits the control information and data addressed to the L-UE #1 on the region 403 of the sub-band #1 402. If the L-UE #2 operates on the sub-band #2 404, the eNB transmits the control information and data addressed to the L-UE #2 on the region 429 of the sub-band #2 404.

The eNB uses the resource corresponding to the region 432, 434, 436, and 438, other than the sub-band #1 402, sub-band #2 404, and sub-band #3 406 for data transmission to the legacy N-UE. Further, the eNB multiplexes the data addressed to the legacy N-UE and the data addressed to the L-UE into the resource regions 428, 429, and 430.

Table 1 shows the sub-band sizes and number of sub-bands available for supporting L-UE per LTE system bandwidth. For example, the system bandwidth of 5 MHz can be divided to configure 1, 2, or 3 sub-bands of 1.4 MHz or 1 sub-band of 3 MHz. At this time, the sum of the bandwidths of the sub-bands cannot exceed the system bandwidth of the LTE system.

TABLE 1

| System bandwidth [MHz] | Combination of subbands (a×b; a: subband bandwidth (MHz), b: number of subbands) |
|---|---|
| 1.4 | — |
| 3 | 1.4 × 1, 1.4 × 2 |
| 5 | 1.4 × 1, 1.4 × 2, 1.4 × 3<br>3 × 1 |
| 10 | 1.4 × 1, 1.4 × 2, 1.4 × 3, 1.4 × 4, 1.4 × 5, 1.4 × 5, 1.4 × 7<br>3 × 1, 3 × 2, 3 × 3<br>5 × 1, 5 × 2 |
| 15 | 1.4 × 1, 1.4 × 2, 1.4 × 3, 1.4 × 4, 1.4 × 5, 1.4 × 6, 1.4 × 7, 1.4 × 8, 1.4 × 9, 1.4 × 10<br>3 × 1, 3 × 2, 3 × 3, 3 × 4, 3 × 5<br>5 × 1, 5 × 2, 5 × 3 |

TABLE 1-continued

| System bandwidth [MHz] | Combination of subbands (a×b; a: subband bandwidth (MHz), b: number of subbands) |
|---|---|
| 20 | 1.4 × 1, 1.4 × 2, 1.4 × 3, 1.4 × 4, 1.4 × 5, 1.4 × 5, 1.4 × 7, 1.4 × 8, 1.4 × 9, 1.4 × 10, 1.4 × 11, 1.4 × 12, 1.4 × 13, 1.4 × 14<br>3 × 1, 3 × 2, 3 × 3, 3 × 4, 3 × 5, 3 × 6<br>5 × 1, 5 × 2, 5 × 3, 5 × 4 |

The method for configuring the control channel for supporting L-UE in the sub-band for the time duration of L-subframe can be implemented in various ways, e.g., FDM, TDM, or FDM/TDM. The control channel includes an L-PDCCH for scheduling the data for an L-UE and a Low-end Physical HARQ Indicator Channel (L-PHICH) for feedback of HARQ ACK/NACK corresponding to the uplink data of the L-UE.

Figure 5:
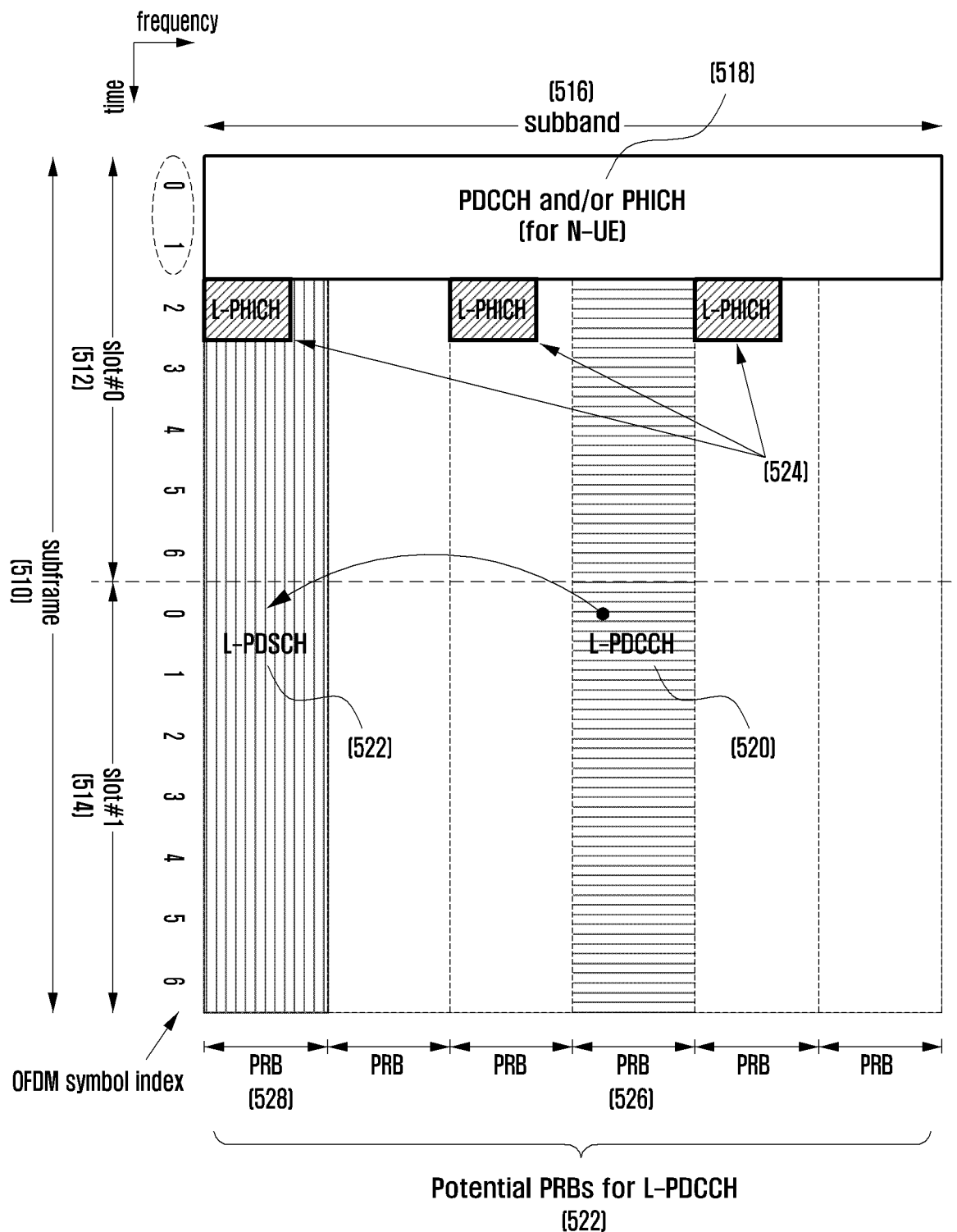
FIG. 5 illustrates a sub-band having an L-UE-specific Physical Downlink Control Channel (L-PDCCH) configured in a Frequency Division Multiplexing (FDM) mode in a subframe having a control region of two OFDM symbols at its beginning, according to an embodiment of the present invention.

FIG. 5 illustrates a sub-band having an L-PDCCH configured in an FDM mode in a subframe having a control region of two OFDM symbols at its beginning, according to an embodiment of the present invention.

Referring to FIG. 5, the sub-band 516 includes 6 PRBs 522, and the control channel 518 includes a PDCCH and a PHICH for the N-UE.

The L-PDCCH 520 is mapped to a specific PRB 626 among the 6 PRBs according to the eNB's decision, in order to be transmitted over the time duration of the L-subframe 510, with the exception of the duration of the first two OFDM symbols. The L-PDCCH 520 provides the downlink scheduling control information corresponding to the Low-end Physical Downlink Shared CHannel (L-PDSCH) 522, which is mapped to the PRB 528 on the same sub-band in the same subframe, with the exception of the duration of its first two OFDM symbols. The eNB determines the PRBs to which the L-PDCCH and the L-PDSCH are mapped among the PRBs of the sub-band based on the control information fed back by the L-UE. The L-PDCCH and L-PDSCH are mapped to one or more PRBs. Typically, the eNB selects the PRB having the best channel condition. The L-PDCCHs for different L-UEs are multiplexed in unit of PRB in the frequency domain (FDM).

The L-PHICH 524 is mapped to the OFDM symbols following the one carrying the PDCCH or PHICH 518 for the N-UE as distributed in the time domain. Specifically, in FIG. 5, the L-PHICH is mapped to the OFDM symbol #2 as distributed on a part of three PRBs. The number and location of the OFDM symbols to which the L-PHICH is mapped and the detailed mapping positions in the frequency domain may vary.

Figure 6:
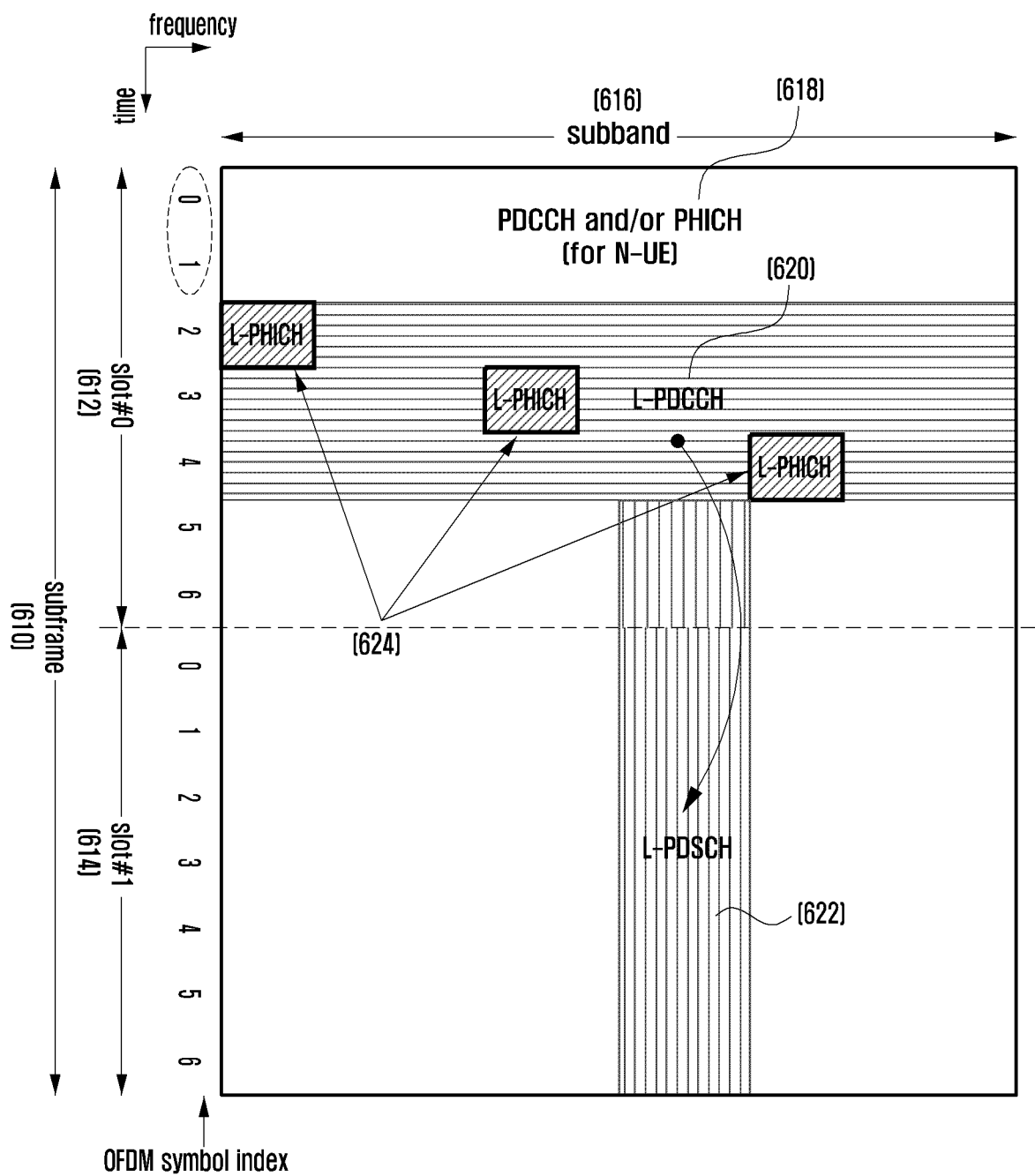
FIG. 6 illustrates a sub-band having an L-PDCCH configured in a Time Division Multiplexing (TDM) mode in a subframe having a control region of two OFDM symbols at its beginning, according to an embodiment of the present invention.

FIG. 6 illustrates a sub-band having an L-PDCCH configured in a TDM mode in a subframe having a control region of two OFDM symbols at its beginning, according to an embodiment of the present invention.

Referring to FIG. 6, the control channel 618 of a PDCCH and/or a PHICH for an N-UE is mapped to two OFDM symbols at a beginning of an L-subframe 610, and the L-PDCCH and L-PHICH for an L-UE are mapped to the OFDM symbol #2, symbol #3, and symbol #4. The L-PDCCH 620 is distributively transmitted across the entire bandwidth of sub-band, and the L-PHICH 624 is segmented into small units in order to be distributed in the frequency and time domains. The L-PDCCHs for the L-UEs are interleaved and multiplexed onto the region of the OFDM symbol #2, symbol #3, and symbol #4 in the sub-band without being overlapped.

The time duration for transmitting the L-PDCCH and L-PHICH can be determined based on a semi-static value signaled by the eNB through higher layer signaling or a value changing dynamically at every subframe through physical layer signaling. The L-PDSCH 622 is mapped to the frequency region indicated by the L-PDCCH after the time duration carrying the L-PDCCH on the same sub-band in the same subframe.

Figure 7:
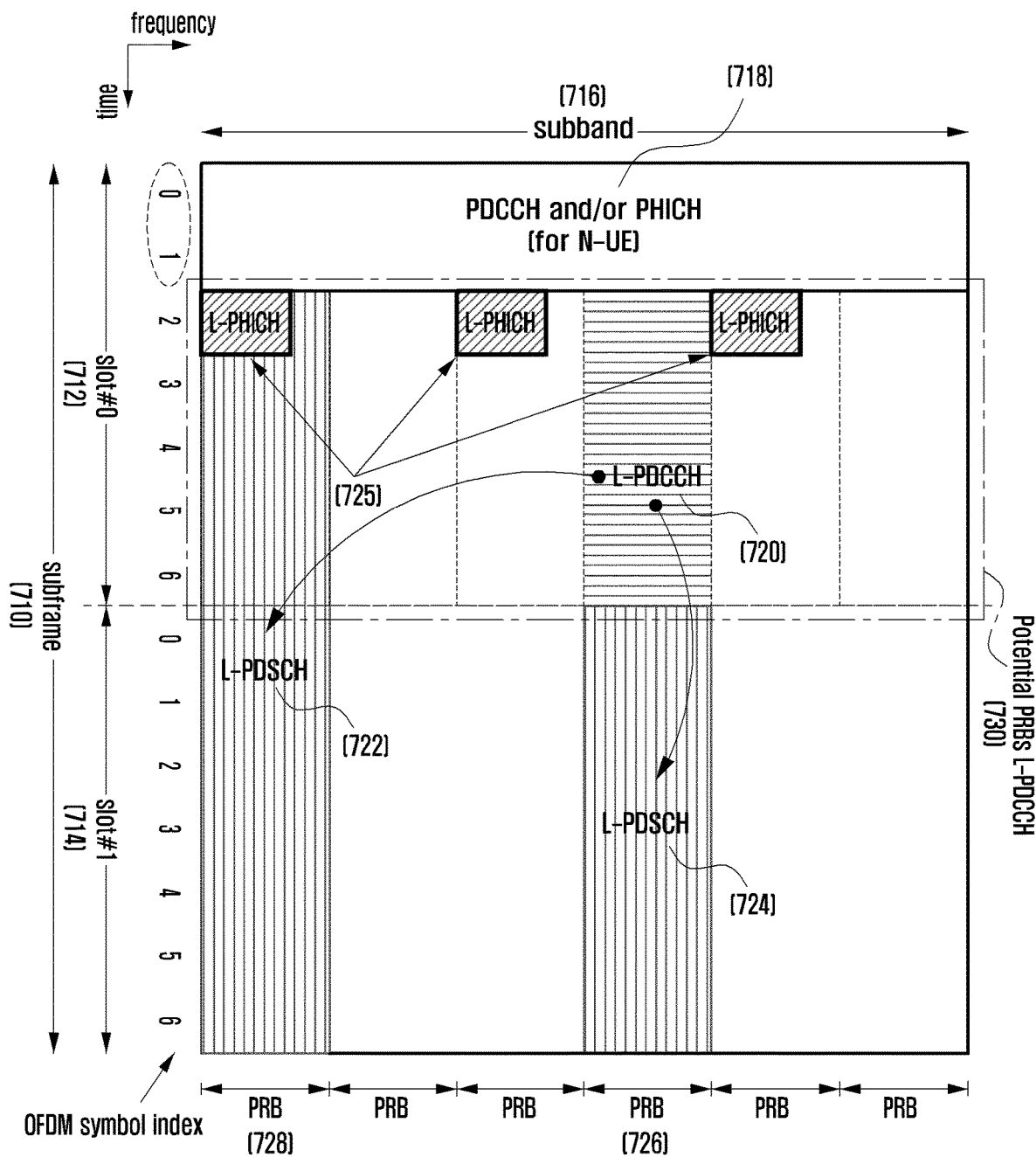
FIG. 7 illustrates a sub-band having an L-PDCCH configured in an FDM/TDM mode in a subframe having a control region of two OFDM symbols at its beginning, according to an embodiment of the present invention.

FIG. 7 illustrates a sub-band having an L-PDCCH configured in an FDM/TDM mode in a subframe having a control region of two OFDM symbols at its beginning, according to an embodiment of the present invention.

Referring to FIG. 7, the sub-band 716 for L-UE includes 6 PRBs 730, and the control channel 718 of PDCCH and/or PHICH for an N-UE is transmitted in two OFDM symbols at a beginning of an L-subframe 710. The L-PDCCH 720 is mapped to a specific PRB 726 among the six PRBs according to the eNB's decision, in order to be transmitted for the time duration of slot #0 712 of the L-subframe, with the exception of the 2 OFDM symbols of control region.

The L-PDSCH 724, which is scheduled by the L-PDCCH 720, is mapped to the same frequency region as the L-PDCCH 720 for the time duration of slot #1 714. Further, the L-PDCCH 720 can be configured for scheduling the L-PDSCH 722 mapped to other PRB 728. At this time, the L-PDSCH 722 is mapped to be transmitted for the entire duration of the L-subframe 710, with the exception of the control region carrying the PDCCH and/or the PHICH.

The L-PDCCHs for different L-UEs are multiplexed in units of a PRB in the frequency domain (i.e., FDM) and multiplexed in units of a slot in the time domain (i.e., TDM). The L-PHICH 725 is mapped to the symbols following the control region 718 of the PDCCH and/or PHICH as distributed in the frequency domain. In FIG. 7, the L-PHICH is mapped to the OFDM symbol #2 in the time domain and a part of each of three different PRBs in the frequency domain.

The L-UE knows the control information on an L-subframe configuration and a sub-band configuration (hereinafter, referred to as an L-MIB) to receive L-PDCCH, L-PHICH, and L-PDSCH. The L-MIB is included in a PBCH along with the legacy MIB and broadcast by the eNB. The L-MIB is transmitted using the reserved bits of the legacy PBCH and follows the rule of channel coding, modulation, and time-frequency resource mapping specified in the LTE standard.

Accordingly, the N-UE can acquire MIB from the PBCH without error in the LTE system. The L-UE receives the PBCH to acquire both the legacy MIB and L-MIB.

The L-MIB includes the following control information:

Subframe set index: an indicator that indicates the L-subframe, which is one of the subframes, excluding the subframes carrying an SCH, a PBCH, a paging message, and an SIB. In an LTE FDD system, it is possible to indicate the L-subframe in the form of a bitmap for subframe #1, subframe #2, subframe #3, subframe #6, subframe #7, and subframe #8. For example, if subframe #1 and subframe #6 are configured as L-subframes, this can be indicated as [1, 0, 0, 1, 0, 0]. Here, bit positions of the bitmap correspond to the respective subframe #1, subframe #2, subframe #3, subframe #6, subframe #7, and subframe #8; and the bit corresponding to subframe configured as L-subframe is indicated is set to 1 and others to 0.

L-PHICH resource information: indicates resource information of an L-PHICH and includes a number of OFDM symbols to which the L-PHICH is mapped or a resource amount in the time domain.

DL sub-band bandwidth configuration: indicates size of the downlink sub-band for an L-UE supported in the LTE system. This is set to a value less than the downlink system bandwidth of the LTE system.

Search space: indicates a PRB to which an L-PDCCH can be mapped in the downlink sub-band for an L-UE. The eNB selects at least one PRB within the configured search space and maps the L-PDCCH to be transmitted to each L-UE to the selected PRB.

The L-MIB may include some or all of the control information. When all of the control information is included in the L-MIB, the L-MIB is configured as shown below, although the relative position of each control information can be changed.

L-MIB={'Subframe set index', 'L-PHICH resource information', 'DL subband bandwidth configuration', 'Search space'}

When a part of the control information is included, the L-MIB can be configured as shown below. In this case, there is no control information on the 'search space' such that the eNB is capable of transmitting L-PDCCH on a certain PRB in the 'DL subband bandwidth configuration'. The control information on the 'search space' can be notified to the UE through a separate L-SIB.

L-MIB={'Subframe set index', 'L-PHICH resource information', 'DL subband bandwidth configuration'}

Alternatively, when a part of the control information is included, the L-MIB can be configured as shown below. In this case, the 'Subframe set index' and 'DL subband bandwidth configuration' can be signaled to the UE through a separate L-SIB or set to predetermined hardcoded values.

L-MIB={'L-PHICH resource information', 'Search space'}

The L-MIB may also be configured with only a 'DL subband bandwidth configuration. In this case, the 'Subframe set index', 'L-PHICH resource information', and 'Search space' can be signaled to the UE through a separate L-SIB or set to predetermined hardcoded values.

L-MIB={'DL subband bandwidth configuration}

The L-MIB may also be configured with only 'L-PHICH resource information as shown below. In this case, the 'Subframe set index', 'DL subband bandwidth configuration', and 'Search space' can be signaled to the UE through a separate L-SIB or set to predetermined hardcoded values.

L-MIB={'L-PHICH resource information'}

The L-MIB may also be configured with only the 'Subframe set index' as shown below. In this case, 'L-PHICH resource information', 'DL subband bandwidth configuration', and 'Search space' can be signaled to the UE through a separate L-SIB or set to predetermined hardcoded values.

L-MIB={'Subframe set index'}

The L-MIB carries the information for receiving downlink control channels, i.e., an L-PDCCH, an L-PHICH, and an L-PDSCH, and the additional control information for supporting an L-UE, i.e., the downlink reception and the uplink transmission control information are configured in an L-SIB in order to be transmitted from the eNB to the UE through L-PDSCH.

The L-SIB includes the following information:

DL subband position: indicates the positing in the frequency region of the downlink subband for an L-UE within the system bandwidth of the LTE system and expressed by the first PRB index of each subband or gap between subbands.

UL subband bandwidth configuration: indicates the size of uplink subband for an L-UE within the uplink system bandwidth of the LTE system. This parameter is set to a value less than the uplink system bandwidth of the LTE system. When "UL subband bandwidth configuration" is associated with "DL subband bandwidth configuration," such that the two parameters have the same value or it is possible to acquire "UL subband bandwidth configuration" from "DL subband bandwidth configuration" included in the L-MIB according to a predetermined rule, the "UL subband bandwidth configuration" signaling can be omitted.

UL subband position: indicates the position in the frequency region of the uplink subband for an L-UE in the system bandwidth of the LTE system and is expressed as the first PRB index of each subband or the gap between subbands. When "UL subband position" is associated with "DL subband position," such that the two parameters have the same value or it is possible to acquire "UL subband position" from "DL subband position" included in the L-SIB according to a predetermined rule, the "UL subband position" signaling can be omitted.

PRACH configuration: is the RACH preamble sequence information used by the L-UE to perform random access and includes the information on the subband and subframe available for RACH preamble transmission.

Physical Channel Configuration: includes the physical channel control information for the L-UE to transmit or receive an L-UE-specific Physical Uplink Control CHannel (L-PUCCH), an L-UE-specific Physical Uplink Shared CHannel (L-PUSCH), L-PDSCH, an L-UE-specific Channel Quality Indicator (L-CQI), L-SRS, etc. The L-PUCCH is the physical channel for the L-UE to transmit uplink HARQ ACK/NACK or the L-CQI and reuses the transmission structure of PUCCH of the legacy LTE system. The L-PUSCH is the physical channel for the L-UE to transmit uplink data and reuses the transmission structure of the PUSCH of the legacy LTE system. The L-PDSCH is the physical channel for the eNB to transmit downlink data to the L-UE and reuses the transmission structure of PDSCH of the legacy LTE system. The L-CQI is the control information fed back from the L-UE to the eNB for the purpose of link adaptation on the downlink physical channel and includes channel condition information and MIMO-related control information expressed by a Modulation and Coding Scheme (MCS). In order to transmit the L-CQI, the L-UE should know the control information, such as a transmission period of the L-CQI and a report type. The L-SRS is the SRS transmitted for the eNB to estimate the uplink channel condition. In order to transmit the L-SRS, the L-UE should know the control information, such as a frequency band and a subframe for the L-SRS transmission.

Prior to the UE operation, the eNB configures the detailed control informations included in the L-MIB and the L-SIB based on the information of the L-UEs to be supported in the LTE/LTE-A system, a number of L-UEs, and available resource amount. The eNB completes the configuration about the detained control informations before transmitting a PBCH and an L-PDCCH/L-PDSCH and reflects the configuration in transmitting the PBCH and the L-PDCCH/L-PDSCH.

More specifically, the eNB generates an L-MIB including the control information related to the L-subframe configuration and subband configuration, and transmits the L-MIB to the UE through the PBCH. The L-MIB may include at least one of a subframe configuration index, L-PHICH resource information, DL subband bandwidth configuration information, and a search space.

The eNB generates an L-SIB including additional control information for supporting the L-UE, in addition to the L-MIB, and transmits the L-SIB to the UE through PDSCH scheduled by the L-PDCCH. The L-SIB may include at least one of a DL subband position, UL subband bandwidth configuration information, UL subband bandwidth configuration information, a UL subband position, PRACH configuration information, and physical channel configuration information.

Afterward, if an attach request is received from a UE, the eNB performs a random access procedure to accept the attach request of the UE.

Figure 8:
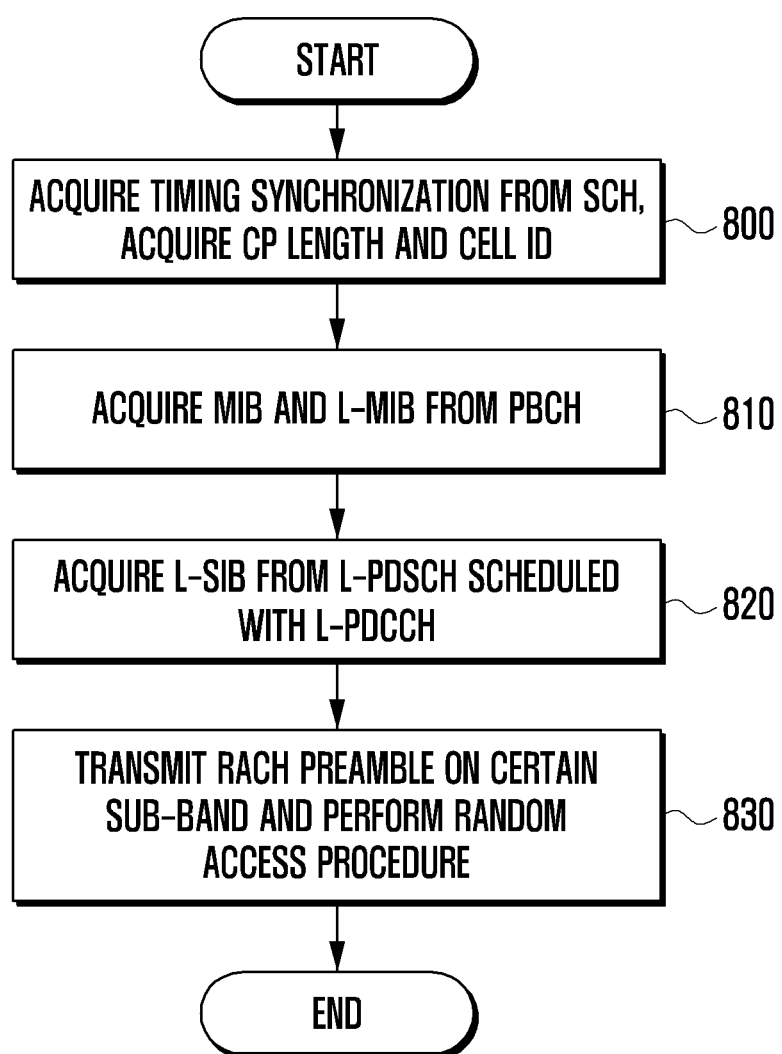
FIG. 8 is a flowchart illustrating a UE procedure for receiving L-MIB and L-SIB and performing a random access procedure according to an embodiment of the present invention.

FIG. 8 is a flowchart illustrating a UE procedure for receiving L-MIB and L-SIB and performing a random access procedure according to an embodiment of the present invention.

Referring to FIG. 8, the L-UE detects an SCH to access the system in step 800. Specifically, the L-UE acquires information, such as radio frame timing synchronization, a cell ID, and a Cyclic Prefix (CP) length from the SCH transmitted by an eNB. The SCH includes a Primary Synchronization Sequence (PSS) and a Secondary Synchronization Sequence (SSS) and is mapped to subframe #0 and subframe #5 to be transmitted. The SCH is mapped to 62 REs in the center frequency of the LTE system band in the frequency domain.

In step 810, the L-UE receives a PBCH including an L-MIB dedicated to the L-UE, in addition to an MIB for an N-UE. The PBCH is mapped to subframe #0 to be transmitted. The PBCH is mapped to 72 REs in the center frequency of the LTE system bandwidth. As described above, the L-MIB may include at least one of a DL subband position, UL subband bandwidth configuration information, UL subband bandwidth configuration information, UL subband position, PRACH configuration information, and physical channel configuration information.

In step 820, the L-UE acquires L-SIB from the L-PDSCH. The L-SIB includes the control information for downlink reception and uplink transmission. The L-UE checks the position of the time-frequency resource to which the L-PDCCH is mapped based on the 'search space' information provided in the L-MIB or according to a predetermined rule. The L-UE extracts the L-PDCCH to receive the L-PDSCH indicated by the L-PDCCH and acquires an L-SIB from the L-PDSCH.

As described above, the L-SIB may include at least one of a DL subband position, UL subband bandwidth configuration information, UL subband bandwidth configuration information, UL subband position, PRACH configuration information, and physical channel configuration information. The L-PDSCH including the L-SIB and the L-PDCCH for scheduling the L-PDSCH are transmitted on a predetermined subband among the downlink subbands for L-UE supported by the LTE system and in a predetermined subframe.

In accordance with an embodiment of the present invention, the subband predetermined for transmitting the L-PDCCH includes the frequency region carrying the SCH and PBCH, such that the L-UE may receive an SCH, a PBCH, and an L-PDCCH, without changing a reception frequency band.

In step 830, the L-UE transmits the RACH preamble on a predetermined uplink subband (hereinafter, referred to as a first uplink subband). More specifically, the L-UE transmits the RACH preamble by referencing a RACH preamble sequence and subband, and subframe available for RACH preamble transmission extracted from the PRACH configuration included in the received L-SIB. Afterward, the L-UE receives a random access response from the eNB in response to the RACH preamble and performs RACH-related process.

In accordance with an embodiment of the present invention, the L-UE is capable of transmitting the RACH preamble in two ways, i.e., method 1 and method 2.

Method 1 restricts the first uplink subband to the subband corresponding to the downlink subband in step 820. That is, the first uplink subband is fixed as a certain subband in method 1. The one or more downlink subbands for an L-UE in the LTE system bandwidth has relationship with one or more uplink subbands for L-UE.

In method 1, the L-UE communicates with the eNB through the fixed subband during an initial random access procedure after receiving the SCH in order to minimize the transmission/reception complexity. If no random access response is received from the eNB and thus the initial random access procedure fails, the UE transmits the RACH preamble on an uplink subband (hereinafter, referred to second uplink subband), which is different from the first uplink subband, to resume the random access procedure. Consequently, the probability of a random access failure is reduced.

Unlike method 1, in method 2, the L-UE transmits the initial RACH preamble without an uplink subband restriction. That is, the RACH preamble is initially transmitted by the L-UE on an uplink subband randomly selected from among the uplink subbands included in the LTE system bandwidth. Method 2 reduces overload caused by a concentration of the RACH preamble transmissions on a specific subband.

In method 2, the L-UE acquires the control information related to the RACH on each uplink subband in an L-MIB and an L-SIB transmitted by the eNB in order to perform random access a certain uplink subband. The eNB configures the RACH-related control information of the respective uplink subbands commonly or individually in adaptation to individual uplink subbands.

When the random access procedure completes successfully in step 830, the L-UE transitions to a Radio Resource Control (RRC) connected (RRC_CONNECTED) state to transmit and receive data in a unicast manner.

Figure 9:
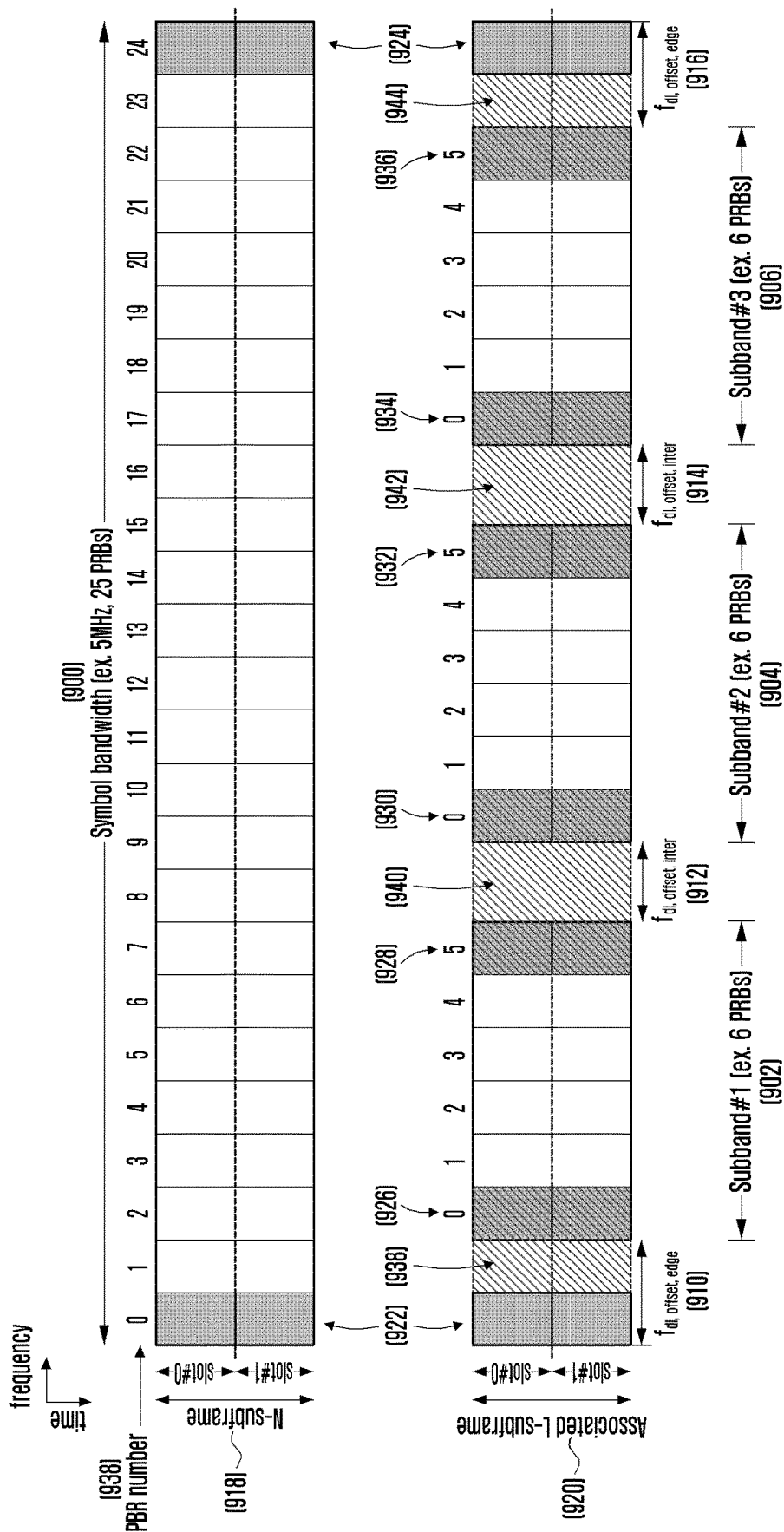
FIG. 9 illustrates a detailed time-frequency resource configuration of an uplink in an N-subframe and an associated L-subframe in an LTE system supporting N-UE and L-UE multiplexing, according to an embodiment of the present invention.

FIG. 9 illustrates a detailed time-frequency resource configuration of an uplink in an N-subframe and associated L-subframe in an LTE system supporting N-UE and L-UE multiplexing according to an embodiment of the present invention.

As described above, the associated L-subframe is in a HARQ timing relationship with the downlink L-subframe and carries an uplink HARQ ACK/NACK and CQI feedback for an L-UE on an L-PUCCH and carries uplink data on an L-PUSCH. In the associated L-subframe, the PUCCH or PUSCH for an N-UE in the associated L-subframe can be transmitted without overlap with the L-PUCCH or the L-PUSCH for the L-UE in the frequency domain. The N-subframe carries a PUCCH or a PUSCH for an N-UE. The N-subframe is capable of carrying the L-PUSCH, but not the L-PUCCH, without overlap with the PUCCH or the PUSCH for the N-UE in the frequency domain.

In FIG. 9, the system bandwidth is 5 MHz and includes 25 PRBs, i.e., PRB #0 to PRB #24. The N-UE is a wideband UE (i.e., a first type UE) supporting a bandwidth of 5 MHz, which is identical to the system bandwidth, and the L-UE is a narrow band UE (i.e., a second type UE) supporting a bandwidth of 1.4 MHz, which is narrower than the system bandwidth.

The eNB is capable of dividing the system bandwidth to generate one or more sub-bands for an L-UE in an associated L-subframe.

In FIG. 9, the system bandwidth is divided into three subbands, i.e., sub-band #1 902, sub-band #2 904, and sub-band #3 906. The bandwidth of each sub-band is 1.4 MHz, which the UE supports, and includes 6 PRBs. The L-UE operates on one of sub-band #1 902, sub-band #2 904, and sub-band #3 906 at a certain instance. The subbands are spaced apart by as much as a predetermined distance to avoid interfering with each other. The sub-band #1 902 is spaced apart from an edge of the system band by as much as $f_{dl,offset,edge}$ 910, and is spaced apart from the sub-band #2 904 by as much as $f_{dl,offset,Inter}$ 912. The sub-band #3 906 is spaced apart from the other edge of the system band by as much as $f_{dl,offset,edge}$ 916, and is spaced apart from the sub-band #2 904 by as much as $f_{dl,offset,Inter}$ 914. The offsets, i.e., $f_{dl,offset,edge}$ 910, $f_{dl,offset,Inter}$ 912, $f_{dl,offset,Inter}$ 914, and $f_{dl,offset,edge}$ 916, and the bandwidth of each sub-band are signaled from the eNB to the UE or set to hardcoded values agreed between the eNB and the UE.

In FIG. 9, reference numbers 922 and 924 denote frequency regions located at both edges of the system bandwidth for a PUCCH for an N-UE. In the N-subframe, the PUSCH and L-PUSCH can be multiplexed in the frequency region with the exception of the regions 922 and 924. In this case, the resource available to be allocated for L-PUSCH transmission is restricted to the sub-band predetermined for use of L-UE.

In the associated L-subframe, reference numbers 926 and 928 denote the PRBs at both edges of the sub-band #1 902 that are configured for L-PUCCH transmission of the L-UE.

In FIG. 9, reference number 926 or 828 corresponds to one PRB. Likewise, reference numbers 930 and 932 denote the PRBs at both edges of the sub-band #2 904 that are configured for L-PUCCH transmission of the L-UE. Also, reference numbers 934 and 936 denote the PRBs at both edges of the sub-band #3 906 that are configured for L-PUCCH transmission of the L-UE.

In the associated L-subframe, the PUCCH transmission resources 922 and 924 of the N-UE have $f_{ul,offset,edge}$ 910 and $f_{ul,offset,edge}$ 916 wide enough to avoid overlapping with the L-PUCCH transmission resources 926 and 936 of the L-UE. The $f_{ul,offset,edge}$ 910 and $f_{ul,offset,edge}$ 916 can be defined as a distance between the uplink sub-band for the L-UE and the PUCCH resource region for the N-UE. The L-PUSCH transmitted by the L-UE in the associated L-subframe is restricted to the frequency region excluding the L-PUCCH transmission resource in the sub-band #1 902, sub-band #2 904, and sub-band #3 906.

In the LTE system, the UE transmits an SRS for the eNB to estimate uplink channel condition. The SRS is mapped to the last symbol of a predetermined uplink subframe and transmitted to the eNB on a predetermined frequency band. Likewise, an L-SRS as the SRS transmitted by L-UE is mapped to the last symbol of a predetermined uplink subframe and transmitted to the eNB on a predetermined frequency band according to an embodiment of the present invention.

Figure 10:
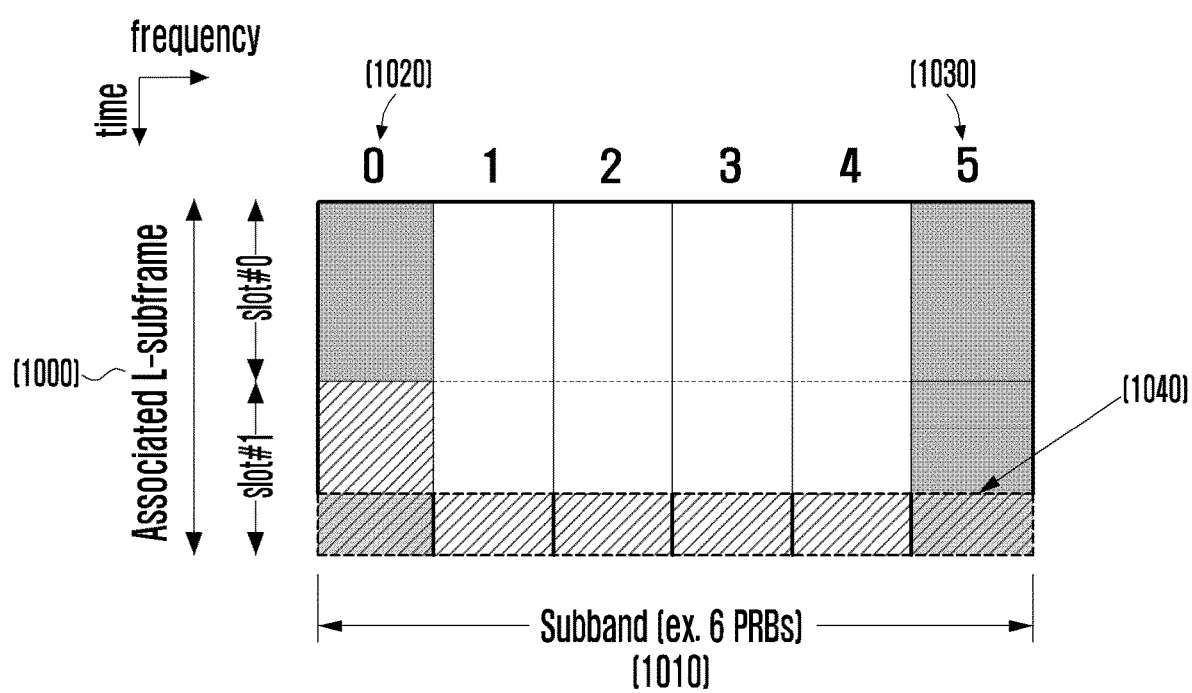
FIG. 10 illustrates a sub-band configured for transmitting a Low-end Sounding Reference Signal (L-SRS) of an L-UE in an LTE system according to an embodiment of the present invention.

FIG. 10 illustrates a sub-band configured for transmitting an L-SRS of an L-UE in an LTE system according to an embodiment of the present invention. Specifically, FIG. 10 illustrates a certain sub-band 1010 configured for use by the L-UE in an associated L-subframe 1000.

Referring to FIG. 10, the sub-band has a bandwidth of 1.4 MHz and includes 6 PRBs. Reference numbers 1020 and 1030 denote the PRBs at both edges of the sub-band 1010 as the frequency resource designated for L-PUCCH transmission of the L-UE. When the associated L-subframe is configured for an L-SRS transmission, the L-UE multiplexes L-SRS in the last symbol 1040 of the associated L-subframe and transmits the L-SRS on a predetermined frequency band the sub-band for L-UE. When the L-PUCCH or L-PUSCH is transmitted with the L-SRS in the associated L-subframe, the L-UE punctures the last symbol of L-PUCCH or L-PUSCH and multiplexes the L-PUCCH or L-PUSCH with the L-SRS.

The L-UE acquires the control information about the L-subframe and frequency band for L-SRS transmission from the L-SIB. The L-SIB may also included the control information about the subframe and frequency band for SRS transmission of the N-UE. If the L-UE is scheduled by the eNB to transmit L-PUSCH in an N-subframe and if the N-subframe is configured for SRS transmission of the N-UE, the L-UE punctures the last symbol of the L-PUSCH to multiplex the L-PUSCH and SRS in the N-subframe.

Figure 11:
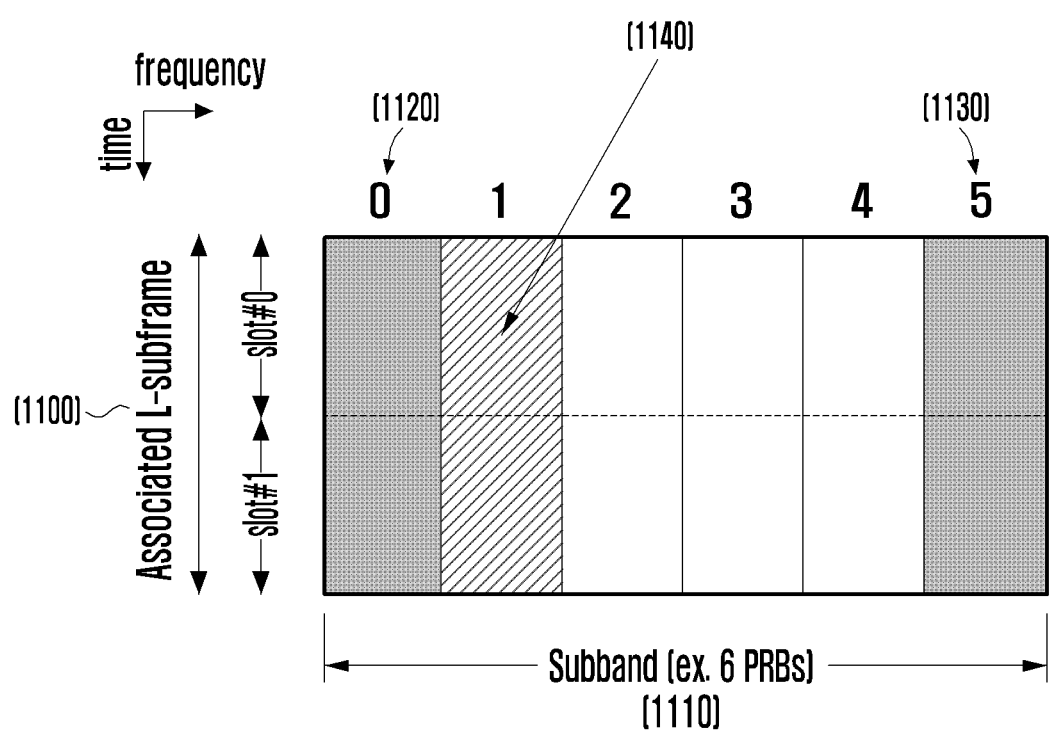
FIG. 11 illustrates a sub-band configured for use by an L-UE in an associated L-subframe in an LTE system according to an embodiment of the present invention.

FIG. 11 illustrates a sub-band configured for use by an L-UE in an associated L-subframe in an LTE system according to an embodiment of the present invention.

Referring to FIG. 11, the sub-band for L-UE has a bandwidth of 1.4 MHz and includes 6 PRBs. Reference numbers 1120 and 1130 denote the PRBs at both edges of the sub-band 1110 as the frequency resource designated for L-PUCCH transmission of the L-UE. The bandwidth of the RACH preamble 1140, which is transmitted the L-UE to trigger a random access procedure, cannot be wider than the sub-band 1110 on which the L-UE operates. Accordingly, the bandwidth of the RACH preamble is less than that corresponding to "bandwidth of sub-band for L-UE—number of PRBs allocated for L-PUCCH in sub-band for L-UE." Because the sub-band for an L-UE is relatively narrow, the smallest unit of frequency bandwidth of the RACH preamble is 1 PRB, and the bandwidth of the RACH preamble can be adjusted in units of 1 PRB. The RACH-related configuration information, such as bandwidth and position of RACH preamble, sub-band, and subframe available for RACH preamble transmission, is transmitted from the eNB to the L-UE through an L-SIB.

Figure 12:
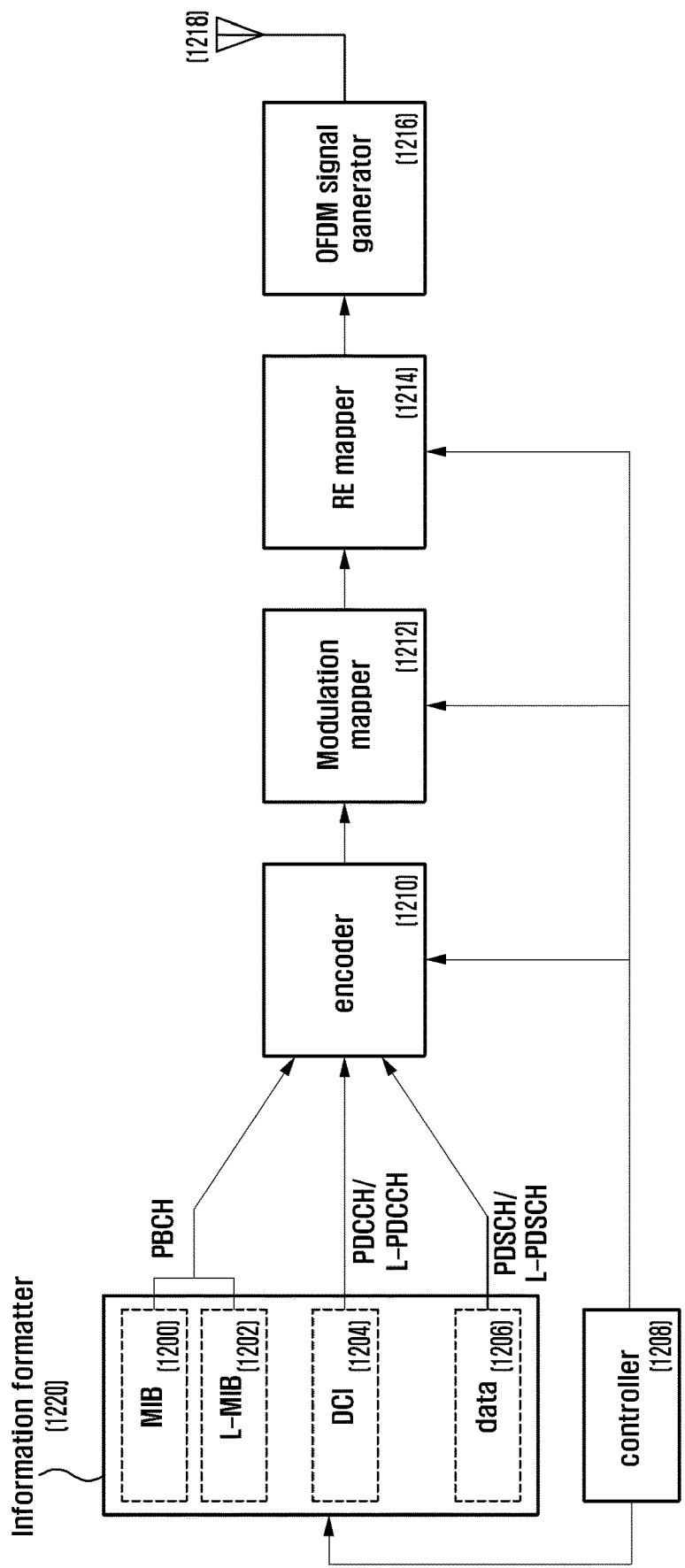
FIG. 12 is a block diagram illustrating an evolved Node B (eNB) according to an embodiment of the present invention.

FIG. 12 is a block diagram illustrating an eNB according to an embodiment of the present invention.

Referring to FIG. 12, the eNB includes a controller 1208, an encoder 1210, a modulation mapper 1212, an RE mapper 1214, an OFDM signal generator 1216, and antenna 1218, and an information formatter 1220.

The controller 1208 configures an L-subframe/N-subframe and a sub-band for an L-UE by referencing the numbers of L-UEs and N-UEs to be supported in the system and a resource amount available in the system and each sub-band. The controller 1208 controls the information formatter 1220 to generate control information or data to the L-UE. The controller 1208 controls the encoder 1210, the modulator 1212, and the RE mapper 1214 according to the channel coding scheme, modulation scheme, and time-frequency resource mapping scheme determined for the physical channel to be transmitted.

The information formatter 1220 includes an MIB generator 1200, an L-MIB generator 1202, a Downlink Control Information (DCI) generator 1204, and a data generator 1206.

The MIB generator 1200 formats the MIB including information on the DL system bandwidth, a PHICH resource, and an SFN, which are used by the UE to access the system, in the PBCH transmission format.

The L-MIB generator 1202 generates an L-MIB including the control information related to the configuration of L-subframe and sub-band for L-UE. The L-MIB may include at least one of a subframe configuration index, L-PHICH resource information, DL sub-band bandwidth configuration information, and a search space. The L-MIB generator 1202 formats the control information in the PBCH transmission format. The formatted MIB and L-MIB are multiplexed into the PBCH, encoded by the encoder 1210 according to the channel coding scheme defined for PBCH, modulated by the modulator 1212, and mapped to time-frequency resource by the RE mapper 1214. The PBCH mapped to the time-frequency resource is processed by the OFDM signal generator 1216 and then transmitted to the UE through the antenna 1218.

The DCI generator 1204 generates DCI for an N-UE or an L-UE in a PDCCH or an L-PDCCH transmission format. The formatted DCI is encoded by the encoder 1210 according to the channel coding scheme defined for the PDCCH or the L-PDCCH, modulated by the modulator 1212, and mapped to the time-frequency resource carrying the PDCCH or the L-PDCCH by the RE mapper 1214. The DCI is processed by the OFDM signal generator 1216 and then transmitted to the UE through then antenna 1218.

The data generator 1206 generates the data addressed to the N-UE or the L-UE in the PDSCH or the L-PDCCH transmission format. The data addressed to the L-UE includes an L-SIB. The formatted data is encoded according to the channel coding scheme defined for the PDSCH or the L-PDSCH by the encoder 1210, modulated by the modulator 1212, and mapped to the time-frequency resource for transmitting PDSCH or L-PDSCH by the RE mapper 1214. The data are processed by the OFDM signal generator 1216 and then transmitted to the UE through the antenna 1218.

Figure 13:
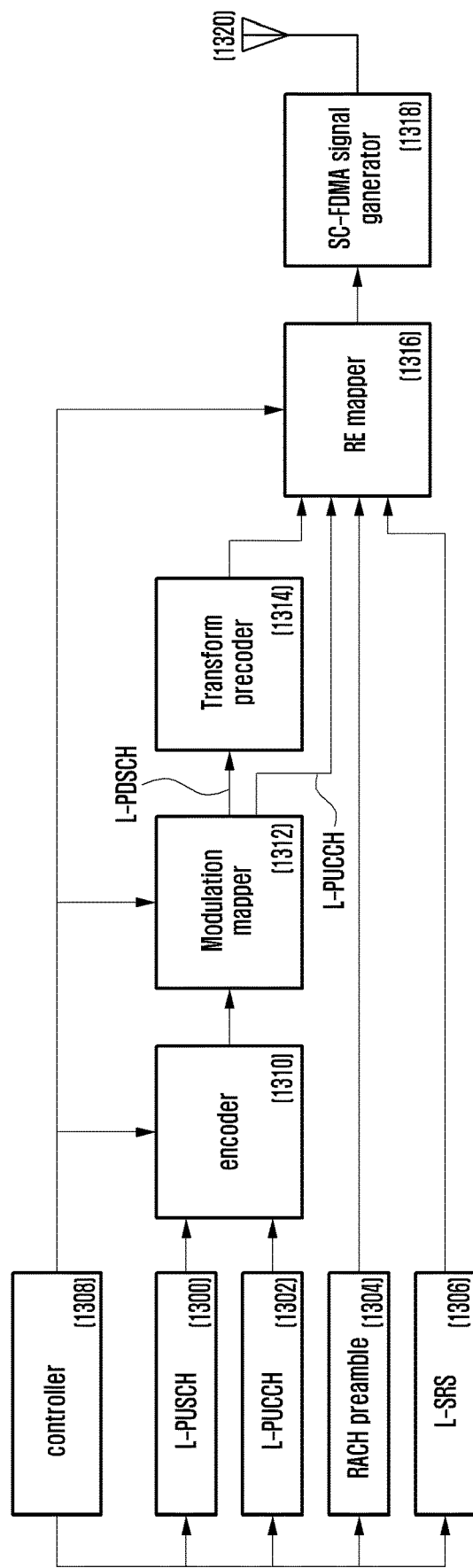
FIG. 13 is a block diagram illustrating an L-UE according to an embodiment of the present invention.

FIG. 13 is a block diagram illustrating an L-UE according to an embodiment of the present invention.

Referring to FIG. 13, the L-UE includes an L-PUSCH generator 1300, an L-PUCCH generator 1302, a RACH preamble generator 1304, an L-SRS generator 1306, a controller 1308, an encoder 1310, a modulator 1312, a transform precoder 1314, an RE mapper 1316, an SC-FDMA signal generator 1318, and an antenna 1320.

The controller 1308 of the L-UE controls transmission of uplink signals such as an L-PUSCH, an L-PUCCH, a RACH preamble, and an L-SRS based on control information such as an MIB, an L-MIB, and an L-SIB received from the eNB. The controller 1308 controls the encoder 1310, the modulator 1312, and the RE mapper 1316 according to the channel coding scheme, modulation scheme, and time-frequency resource mapping scheme defined for physical channels to be transmitted.

If uplink scheduling information is received from the eNB, the L-PUSCH generator 1300 generates an L-PUSCH corresponding to the uplink scheduling information and the encoder 1310 encodes the L-PUSCH according to a channel coding scheme defined for the L-PUSCH. The modulator 1312 modulates the coded signal, the transform precoder 1314 DFT-processes the modulated signal, and the RE mapper 1316 maps the process result to the time-frequency resource allocated for the L-PUSCH. The SC-FDMA signal generator 1318 processes the data, which is then transmitted to the eNB through the antenna 1320.

In order to transmit an uplink HARQ ACK/NACK or an L-CQI, the L-PUCCH generator 1302 configures the L-PUCCH, the encoder 1310 encodes the L-PUCCH according to the channel coding scheme defined for L-PUCCH, the modulator 1312 modulates the encoded signal, and the RE mapper 1316 maps the modulated signal to the time-frequency resource allocated for L-PUCCH transmission. The L-PUCCH is processed by the SC-FDMA signal generator 1318 and then transmitted to the eNB through the antenna 1320.

In order to perform random access, the RACH preamble generator 1304 configures a RACH preamble and the RE mapper 1316 maps the RACH preamble to the time-frequency resource allocated for RACH preamble transmission. The RACH preamble is processed by the SC-FDMA signal generator 1318 and then transmitted to the eNB through the antenna 1320.

In order to transmit an L-SRS, the L-SRS generator 1306 generates the L-SRS and the RE mapper 1316 maps the L-SRS to the time-frequency resource allocated for L-SRS transmission. The L-SRS is processed by the SC-FDMA signal generator 1318 and then transmitted to the eNB through the antenna 1320.

As described above, the system access method of a narrowband UE according to the present invention is advantageous in that the narrowband UEs can be supported along wideband UEs in a wireless communication system.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A method by a terminal in a wireless communication system, the method comprising:
    receiving, from a base station, a first master information block (MIB) including information associated with a resource for a first physical downlink control channel (PDCCH), through a physical broadcast channel, the information indicating a frequency resource of the resource for the first PDCCH;
    identifying the frequency resource of the resource for the first PDCCH based on the information associated with the resource for the first PDCCH;
    detecting downlink control information including scheduling information based on the frequency resource of the resource for the first PDCCH; and
    receiving, from the base station, system information through a first physical downlink shared channel (PDSCH) based on the scheduling information,
    wherein the system information includes information associated with a bandwidth of a downlink sub-band and a location of the downlink sub-band,
    wherein the system information further includes information associated with a bandwidth of an uplink sub-band and a location of the uplink sub-band, and
    wherein the system information is scheduled within a frequency range of the resource for the first PDCCH.

2. The method of claim 1, wherein the location of the downlink sub-band and the location of the uplink sub-band correspond to a start resource block of the downlink sub-band and a start resource block of the uplink sub-band, respectively.

3. The method of claim 1, wherein the information associated with the resource for the first PDCCH corresponds to at least one physical resource block (PRB) to which the first PDCCH is to be mapped.

4. The method of claim 1, wherein the resource for the first PDCCH corresponds to a search space for the first PDCCH.

5. The method of claim 1, wherein the system information includes information associated with a random access channel (RACH) configuration.

6. A terminal in a wireless communication system, the terminal comprising:
    a transceiver; and
    a controller configured to:
        receive, from a base station via the transceiver, a first master information block (MIB) including information associated with a resource for a first physical downlink control channel (PDCCH), through a physical broadcast channel, the information indicating a frequency resource of the resource for the first PDCCH,
        identify the frequency resource of the resource for the first PDCCH based on the information associated with the resource for the first PDCCH,
        detect downlink control information including scheduling information based on the frequency resource of the resource for the first PDCCH, and
        receive, from the base station via the transceiver, system information through a first physical downlink shared channel (PDSCH) based on the scheduling information,
    wherein the system information includes information associated with a bandwidth of a downlink sub-band and a location of the downlink sub-band,
    wherein the system information further includes information associated with a bandwidth of an uplink sub-band and a location of the uplink sub-band, and
    wherein the system information is scheduled within a frequency range of the resource for the first PDCCH.

7. The terminal of claim 6, wherein the location of the downlink sub-band and the location of the uplink sub-band correspond to a start resource block of the downlink sub-band and a start resource block of the uplink sub-band, respectively.

8. The terminal of claim 6, wherein the information associated with the resource for the first PDCCH corresponds to at least one physical resource block (PRB) to which the first PDCCH is to be mapped.

9. The terminal of claim 6, wherein the resource for the first PDCCH corresponds to a search space for the first PDCCH.

10. The terminal of claim 6, wherein the system information includes information associated with a random access channel (RACH) configuration.

11. A method by a base station in a wireless communication system, the method comprising:
    transmitting a first master information block (MIB) including information associated with a resource for a first physical downlink control channel (PDCCH) through a physical broadcast channel, the information indicating a frequency resource of the resource for the first PDCCH;
    transmitting downlink control information including scheduling information through the first PDCCH based on the frequency resource of the resource for the first PDCCH; and
    transmitting, system information through a first physical downlink shared channel (PDSCH) based on the scheduling information,
    wherein the system information includes information associated with a bandwidth of a downlink sub-band and a location of the downlink sub-band, wherein the system information further includes information associated with a bandwidth of an uplink sub-band and a location of the uplink sub-band, and wherein the system information is scheduled within a frequency range of the resource for the first PDCCH.

12. The method of claim 11, wherein the location of the downlink sub-band and the location of the uplink sub-band correspond to a start resource block of the downlink sub-band and a start resource block of the uplink sub-band, respectively.

13. The method of claim 11, wherein the information associated with the resource for the first PDCCH corresponds to at least one physical resource block (PRB) to which the first PDCCH is to be mapped.

14. The method of claim 11, wherein the resource for the first PDCCH corresponds to a search space for the first PDCCH.

15. The method of claim 11, wherein the system information includes information associated with a random access channel (RACH) configuration.

16. A base station in a wireless communication system, the base station comprising:
a transceiver configured to transmit and receive a signal; and
a controller configured to:
transmit a first master information block (MIB) including information associated with a resource for a first physical downlink control channel (PDCCH) through a physical broadcast channel, the information indicating a frequency resource of the resource for the first PDCCH, transmit downlink control information including scheduling information through the first PDCCH based on the frequency resource of the resource for the first PDCCH, and transmit system information through a first physical downlink shared channel (PDSCH) based on the scheduling information, wherein the system information includes information associated with a bandwidth of a downlink sub-band and a location of the downlink sub-band, wherein the system information further includes information associated with a bandwidth of an uplink sub-band and a location of the uplink sub-band, and wherein the system information is scheduled within a frequency range of the resource for the first PDCCH.

17. The base station of claim 16, wherein the location of the downlink sub-band and the location of the uplink sub-band correspond to a start resource block of the downlink sub-band and a start resource block of the uplink sub-band, respectively.

18. The base station of claim 16, wherein the information associated with the resource for the first PDCCH corresponds to at least one physical resource block (PRB) to which the first PDCCH is to be mapped.

19. The base station of claim 16, wherein the resource for the first PDCCH corresponds to a search space for the first PDCCH.

20. The base station of claim 16, wherein the system information includes information associated with a random access channel (RACH) configuration.

* * * * *